H. R. DAVIES.
HEADLIGHT.
APPLICATION FILED NOV. 23, 1917.
1,362,085.
Patented Dec. 14, 1920.
2 SHEETS—SHEET 1.
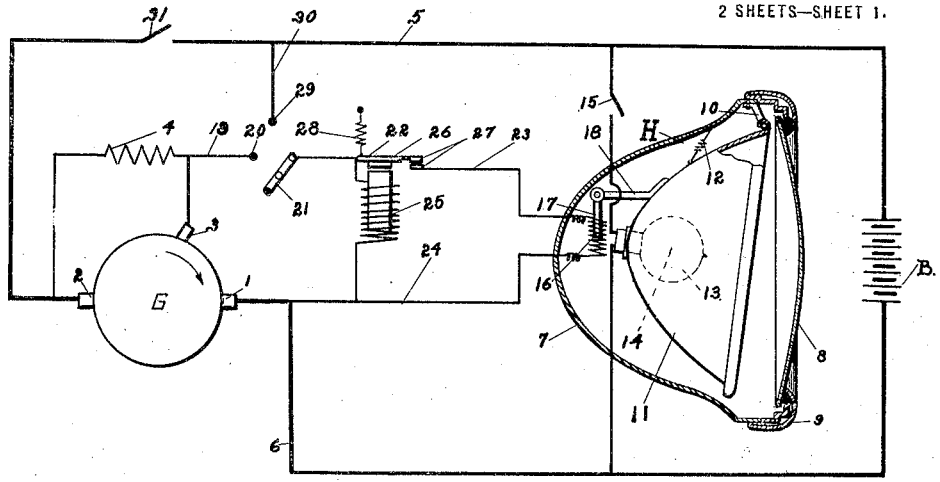
Fig. I.
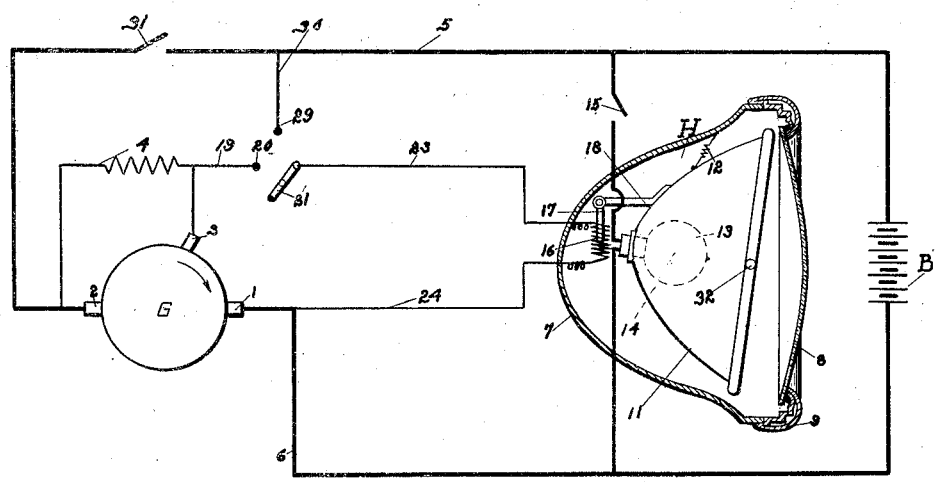
Fig. II.
Inventor
Henry R. Davies
By Chester H. Braselton
Attorney H. R. DAVIES.
HEADLIGHT.
APPLICATION FILED NOV. 23, 1917.
1,362,085.
Patented Dec. 14, 1920.
2 SHEETS—SHEET 2.
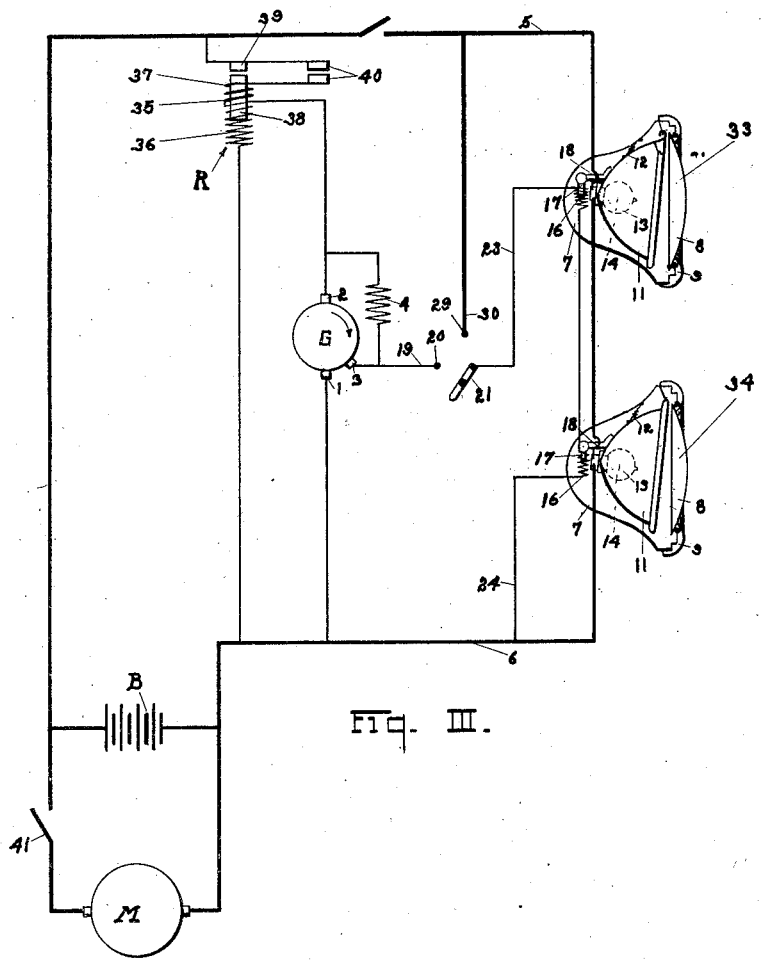
Fig. III.
Inventor
Henry R. Davies
By Chester H Braselton
Attorney

UNITED STATES PATENT OFFICE.

HENRY R. DAVIES, OF TOLEDO, OHIO, ASSIGNOR TO ELECTRIC AUTO-LITE CORPORATION, OF TOLEDO, OHIO, A CORPORATION OF DELAWARE.

HEADLIGHT.

1,362,085. Specification of Letters Patent. Patented Dec. 14, 1920.

Application filed November 23, 1917. Serial No. 203,568.

*To all whom it may concern:*

Be it known that I, HENRY R. DAVIES, a citizen of the United States, residing at Toledo, in the county of Lucas and State of Ohio, have invented certain new and useful Improvements in Headlights, of which I declare the following to be a full, clear, and exact description.

This invention relates to headlights, and more particularly to the type of headlights applied to automobiles.

The principal object of this invention is to provide in an automobile headlight, in which the reflector is movably mounted within the casing, entirely automatic means for moving the reflector. Another object is to employ means for tilting the reflector which is normally dependent for its operation upon the speed of the automobile engine.

Further objects of this invention relate to economies of manufacture and details of construction as will hereinafter appear from the detailed description to follow. I accomplish the objects of my invention in one instance by the devices and means described in the following specification, but it is evident that the same may be varied widely without departing from the scope of the invention as pointed out in the appended claims. A structure constituting one embodiment of my invention, which may be the preferred, is illustrated in the accompanying drawings forming a part hereof, in which:

Figure I is a diagrammatic view of the various parts comprising the system, illustrating the interconnection between the various elements;

Fig. II is a diagrammatic view of a modified arrangement; and

Fig. III is a similar view including a plurality of lighting units.

In the drawings, similar reference numerals refer to similar parts throughout the several views.

It has been found desirable for considerations of safety in road traffic, to eliminate as far as possible, the glare accompanying automobile headlight illumination. Various dimming devices have been employed, but the resultant decreased lighting efficiency has militated against their general use. It is proposed in this invention, to employ a headlight in which the reflector may be automatically tilted in a vertical plane whereby the beam of light may be either maintained in its normal position, parallel to the direction of motion of the automobile, or thrown down in front of the automobile, at any desired angle to this normal position, thereby not only obviating glare, but also affording means for ample illumination directly in front of the wheels.

Referring to Fig. I of the drawings, I have shown an electric generator G, connected in the lighting circuit, including the battery B, and headlight H. The generator G, is a direct current machine having inherent speed regulation of the type known as "third brush," and has main brushes 1 and 2, and a third brush 3, the main brush 2, forming with the brush 3, the terminals of the shunt field 4. The generator G, is the usual generator employed in electric starting and lighting systems, and my invention provides electrical connections with the usual starting and lighting system of a motor vehicle, such that the reflector of the headlight will be actuated automatically at a predetermined engine speed.

Connected across the generator mains 5 and 6, are the storage battery B, and the headlight H. The headlight exterior is of ordinary design, and includes a casing 7, a glass 8, and a retaining flange 9. On a bracket 10, attached to the lower side of the casing rim at its top, the reflector 11, is pivotally mounted or hung.

The reflector has an approximate parabolic shape and is held normally in a downwardly tilted position by means of a spring 12, secured to the upper side of the reflector 11, and to the casing 7. A lamp 13, connected to the mains 5 and 6, is inserted at the focus 14, of the reflector 11, and is controlled by a switch 15. Intermediate the apex of the reflector and the casing an electro-magnet 16, is secured, and in this electro-magnet, a core 17, having pivotal connection with a bracket 18, fixed to the reflector casing, is mounted for axial movement.

The electro-magnet 16 is connected between the third brush 3, and the main brush 1, through the wire 19, contact 20, switch 21, relay 22, wire 23, and wire 24. The relay 22 has a coil 25, shunted in parallel with the electro-magnet 16, which operates to attract the armature 26, of contacts 27, in the electro-magnet circuit. These contacts 27, are normally held out of engagement by means of a spring 28. The switch 21, is also adapted to connect the electro-magnet 16, to the main brush 2, through the contact 29, and circuit 30. A switch 31, which may be either automatic or manual, is placed in the main circuit intermediate the battery and dynamo, in order to prevent the battery from discharging through the dynamo.

In Fig. II of the drawing, I have indicated a modified system in which the relay is removed and the reflector mounted on transverse trunnions 32.

Fig. III shows the arrangement of Fig. II applied to two lighting units 33 and 34, and in addition, shows a reverse current cut-out R, and engine starting motor M. The cut-out is of a well known form, and comprises an electro-magnet 35, with a shunt coil 36, connected across the dynamo mains, a series coil 37, and a core 38, an armature 39, and contacts 40. A switch 41 is shown in the motor circuit.

The operation of the system will now be described. Referring to Fig. I, the switch 21, is normally in contact at 20, and the reflector 11, tilted downwardly by the spring 12. In this position, when the lamps are turned on, and the engine stationary or rotating at slow speeds, the light will be reflected in a general downward direction, so as to illuminate the road immediately in front of the automobile. In this position also, it will be impossible for the light to inconvenience approaching pedestrians or drivers of vehicles.

It is a characteristic of the type of generator described, that for the direction of rotation indicated, and for a fairly constant load, the voltage between the third brush 3, and the main brush 1, varies approximately, and in the same direction as the speed of revolution; and inasmuch as the generator is positively driven from the engine crankshaft, a variation in voltage with velocity of car motion is obtained. As the generator speed increases, a point is reached where the voltage on the relay 22 is sufficient to close the contacts 27, thereby permitting circuit to pass through the electro-magnet 16, and actuate the movable core 17. By this means, the reflector is tipped upwardly, and the light rays reflected in a direction parallel to the longitudinal axis of the automobile, thereby increasing the range of effective illumination. The relay and electro-magnet are so designed, that the reflector will be actuated at a certain automobile speed, above which the light rays are held parallel with the car.

It is desirable at times, when the automobile is moving at slow speed, to illuminate the roadway at some distance ahead, as, for example, when turning into a new road. To accomplish this result without speeding up the engine, the contact 29, and circuit 30, is provided whereby the full dynamo or battery voltage may be impressed on the relay circuit. Also, by disconnecting the switch 21 from either contact when running at high speeds, the electro-magnet circuit 16, is opened and the reflector pulled downwardly by the spring 12, thereby obviating glare without slowing down the machine.

The operation of the modified system of Fig. II, is similar to that of Fig. I, except that the absence of the relay prevents as close a determination of the point of actuating of the reflector, as in the preferred form.

In Fig. III, the two headlights have their electro-magnets connected in series, thus allowing a simultaneous actuation of the reflectors.

It should be apparent from the above description, that the operation of the system when the switch 21 is connected to the contact 20, is entirely automatic, depending upon the speed at which the engine rotates, or in general, upon the speed of the automobile, and thereby providing illumination appropriate to speed conditions.

Having thus described my invention, what I claim as new and desire to secure by Letters Patent, is:—

1. In a lighting system for motor vehicles, the combination of a headlight casing, a reflector in said casing movably mounted therein, said reflector adapted to project light in either a downwardly or a substantially horizontal direction, and automatic means for swinging said reflector to project the light in one or the other of said directions dependent upon the motor speed.

2. In a lighting system for motor vehicles, the combination of a headlight casing, a reflector mounted to tilt in said casing for projecting the light rays either substantially horizontal or in a downward direction and electrical means dependent upon motor speed for tilting said reflector.

3. In a lighting system for motor vehicles, the combination of a headlight casing, a reflector in said casing movably mounted therein, said reflector being adapted to project light in either a downwardly or a substantially horizontal direction, and electro-magnetic means dependent upon motor speed for swinging said reflector from one of said light projecting positions to the other.

4. In a lighting system for motor vehicles, the combination of a headlight casing; a reflector pivotally mounted in said casing; and electrical means operable at a predetermined motor speed for tilting said reflector.

5. In a lighting system for motor vehicles, a headlight constructed to project a beam of light in either a substantially horizontal direction or at an angle thereto and means dependent upon the speed of the motor for moving said beam from one of said directions to the other.

6. In a lighting system for motor vehicles, the combination of a headlight casing; a reflector in said casing pivotally mounted therein; means dependent upon motor speed for tilting said reflector; and means manually operable for rendering said first named means inoperative.

7. In a lighting system for motor vehicles, the combination of a headlight casing; a reflector in said casing pivotally mounted therein; automatic means dependent upon motor speed for tilting said reflector; and additional means manually operable for tilting the reflector at will.

8. In combination, a headlight casing for motor vehicles; a reflector pivotally mounted in said casing; an electro-magnet in said casing, having a core; a bracket connecting the core and reflector; an electric generator having brushes between which the voltage varies directly as the speed of armature rotation connected to operate the electromagnet at a predetermined speed; a circuit including said electromagnet and brushes; and a switch in the circuit.

9. In combination, a headlight casing for motor vehicles; a reflector pivotally mounted in said casing; an electromagnet in said casing, having a core; a bracket connecting the core and reflector; an electric generator having brushes between which the voltage varies directly as the speed of armature rotation; a circuit including said electro-magnet and brushes; and an automatic switch in said circuit, adapted to close when the generator has reached a predetermined speed.

10. In combination, a headlight casing for motor vehicles; a reflector pivotally mounted in said casing; an electro magnet in said casing, having a core; a bracket connecting the core and reflector; an electric generator having brushes between which the voltage varies directly as the speed of armature rotation; a circuit including said electro-magnet and brushes; and voltage responsive means operable to close said circuit at a predetermined voltage.

11. In a lighting system for motor vehicles in combination, a head light casing; means for normally directing light rays at an angle to the longitudinal axis of the vehicle; and means controlled by the motor speed, for directing the light rays substantially parallel with said axis.

12. In combination, a headlight casing for motor vehicles; a reflector pivotally mounted in said casing; an electro-magnet in said casing, having a core; a bracket connecting the core and reflector; an electric generator having brushes between which the voltage tends to increase with increase of armature speed; a circuit including said electro-magnet and said brushes whereby the energization of said magnet varies in accordance with the speed; and a manual switch in said circuit.

13. In a motor vehicle lighting system, the combination of a generator, a headlight adapted to receive current therefrom, said headlight including a tiltable reflector and means controlled by the speed of said generator for tilting said reflector.

14. The combination with a motor vehicle lighting system including a generator; of a headlight casing; a reflector pivotally mounted therein; and electrically operated means connected in circuit with said generator and responsive to generator speed for tilting said reflector.

15. The combination with a motor vehicle lighting system including a generator; of of a headlight casing; a reflector pivotally mounted therein; and automatic electric means for tilting said reflector at a predetermined generator speed.

16. The combination with a motor vehicle lighting system including a generator; of a headlight casing; a reflector pivotally mounted therein; a circuit including said generator adapted to tilt said reflector at a predetermined generator speed; and a manually operable switch in said circuit.

17. In a lighting system for motor vehicles the combination of a headlight casing, a tiltable reflector therein whose position for normal running is such that the rays of light are projected substantially horizontal and means for automatically moving said reflector to a non-glare position when the motor runs at a predetermined low speed, or stops.

18. In a lighting system for motor vehicles the combination of a headlight casing, a reflector mounted to swing in said casing, automatic means dependent upon motor speed to tilt said reflector, means opposing said tilting movement and manually controlled means for rendering said automatic means inoperative to permit said opposing means to become effective.

19. In a lighting system for motor vehicles, a headlight having a tiltably mounted reflector therein, means for tilting said reflector to a non-glare position when the motor vehicle is inoperative and means for automatically moving said reflector to a position to project a substantially horizontal beam of light when said motor vehicle is operated.

In testimony whereof, I affix my signature.

HENRY R. DAVIES.